US011257049B1

(12) United States Patent
Durazo Almeida et al.

(10) Patent No.: US 11,257,049 B1
(45) Date of Patent: Feb. 22, 2022

(54) ITEM IDENTIFICATION BASED ON RECEIPT IMAGE

(71) Applicant: Amazon Technologies, Inc., Seattle, WA (US)

(72) Inventors: Miguel Roman Durazo Almeida, La Jolla, CA (US); Thanhthanh Anh Tran, Cardiff-by-the-Sea, CA (US); Jongsun Jung, Tustin, CA (US); Rohin Patel, La Verne, CA (US); Anna Jin Li, Irvine, CA (US); Tarmandeep Toor, Dallas, TX (US); Shih-Ta Peng, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 16/779,210

(22) Filed: Jan. 31, 2020

(51) Int. Cl.
*G06Q 30/00* (2012.01)
*G06Q 20/04* (2012.01)
*G06Q 30/06* (2012.01)
*G06Q 20/20* (2012.01)
*G06K 9/00* (2022.01)

(52) U.S. Cl.
CPC ....... *G06Q 20/045* (2013.01); *G06K 9/00456* (2013.01); *G06Q 20/209* (2013.01); *G06Q 30/0631* (2013.01)

(58) Field of Classification Search
None
See application file for complete search history.

(56) References Cited

U.S. PATENT DOCUMENTS

| 8,285,604 B1 * | 10/2012 | Trandal | G06Q 20/209 |
| | | | 705/26.7 |
| 2009/0089273 A1 * | 4/2009 | Hicks | G06F 16/00 |

* cited by examiner

*Primary Examiner* — Rokib Masud
(74) *Attorney, Agent, or Firm* — Lee & Hayes, P.C.

(57) ABSTRACT

An image of a receipt may be received by a service provider from a user device of a user. The receipt may be a record of a transaction between the user and a physical merchant. The service provider may extract text from the image and apply a predictive model trained on text data of historical receipts to the extracted text to identify keywords corresponding to items purchased in the transaction. The service provider may generate a shopping list for the user and/or may compare the keywords to descriptions of catalog items in an online catalog maintained by the service provider to identify catalog items that are the same or similar to the purchased items. The service provider may associate the catalog items with the user's account maintained by the service provider and generate a user interface to present on the user device that includes an indication of the catalog items.

20 Claims, 10 Drawing Sheets

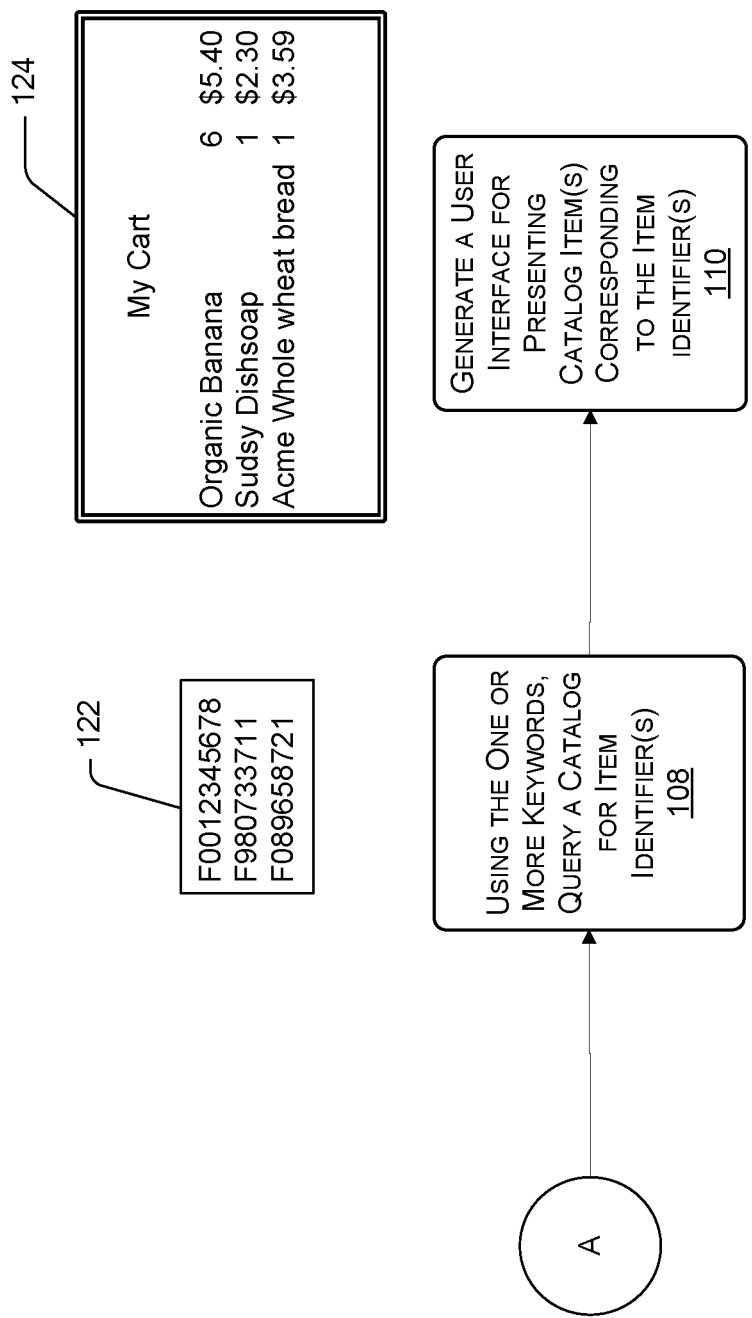

ITEM IDENTIFICATION BASED ON RECEIPT IMAGE

BACKGROUND

Online shopping can provide a convenient alternative to shopping at physical stores. For example, groceries can be purchased online and delivered to customers. However, online merchants frequently lack information (e.g., during an onboarding of a customer) about the items customers have been purchasing locally, and customers have traditionally not had access to a mechanism to efficiently provide product identifiers to online merchants, especially in bulk. The disconnect between the identity of items customers purchase in physical stores and the identity of items offered for sale online hinders the ability to direct customers towards items offered for sale online that are comparable in quality, brand, size, etc. to what customers are used to being able to locate and purchase at a local store.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
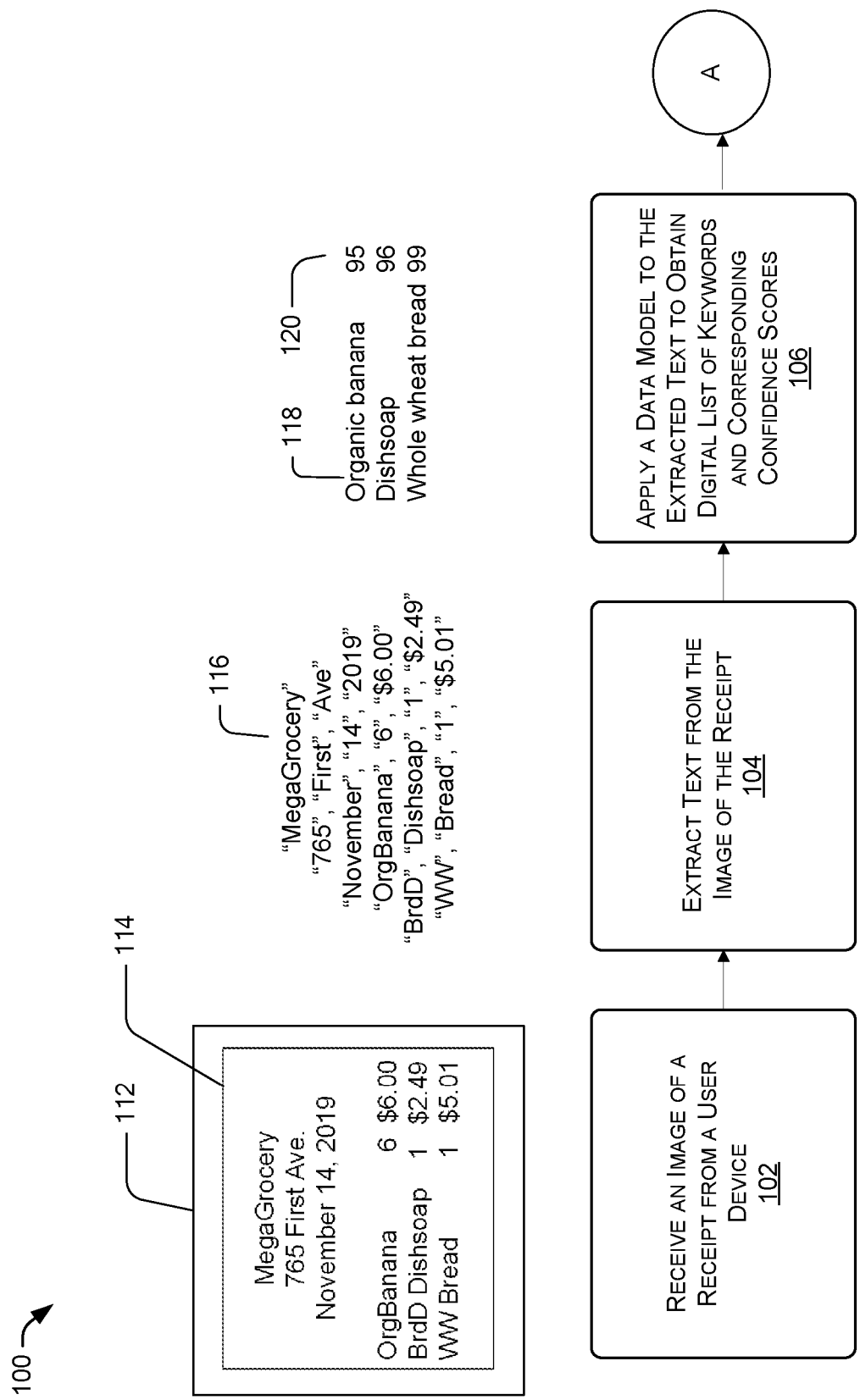
FIG. 1 is a schematic diagram of an example process for analyzing text extracted from a physical receipt to generate a list of keywords corresponding to purchased items and using the keywords to identify item identifiers representing catalog items

Techniques described herein are directed to extracting text from images of receipts showing purchases of a user at a physical location of a merchant, and applying a data model (also referred to herein as "predictive model") to the extracted text to generate a list of keywords corresponding to purchased items. The list of keywords may be at least one of stored, provided to a user, revised by a user, or used to query one or more stores or online catalogs. Using the techniques described herein, a service provider may ingest images of hard copy receipts showing items ("receipt items") purchased from a physical store and generate a list of keywords that the service provider predicts are words that describe the receipt items. In some embodiments, a keyword can be a brand name, a generic name, a category of items, a number, etc. In some embodiments, the keywords may be used to identify the same or similar items ("catalog items") offered for sale via an online catalog of the service provider. In some examples, the service provider receives a receipt image captured by a user device (e.g., mobile phone, tablet device, etc.) of the user, where the user has a user profile/account with the service provider or at least utilizes services offered by the service provider.

The extracted text from the images of the receipts can enable the service provider to identify keywords associated with the items that a particular user has purchased from a physical location of a merchant (sometimes referred to as a "brick-and-mortar store"). In some instances, the service provider may electronically offer, via a website and/or mobile application, the same items or items that are associated with the keywords determined from analysis of the extracted text. The service provider may utilize the keywords representative of the purchased items to generate and/or refine suggestions for the same or similar types of items a user might be interested in purchasing online via the service provider.

The data obtained from the images of the receipts, in addition to indicating the identity of items purchased by a user at a physical location of a merchant, can also provide a more global assessment of the types of items that the user typically purchases and/or the identity of merchants from which the user purchases items. The service provider may utilize such data to identify and/or refine the types of items that the service provider should recommend or suggest to the user. In examples, the data may also be used as training data for a data model that, given text of a receipt image, generates keywords for purchased items. In some embodiments, multiple features of data extracted from a physical receipt (e.g., item description, item identification number, store name, store address, date of receipt, price, brand, etc.) may be incorporated into the training data in order to improve the keyword prediction, assess regional trends, recommend prices, learn merchant receipt syntax, etc. In some embodiments, all text extracted from a receipt may be incorporated into the training data.

"Mapping," as used herein, may include making associations between data within a database or data structure. Thus, when a receipt item is "mapped" to a keyword or catalog item, data representing the receipt item is associated with data representing one or more keywords or catalog items. The service provider can provide a list of keywords to the user and/or use the keywords or catalog items to populate a user's virtual cart or a user's virtual shopping list maintained by the service provider.

In some embodiments, a service provider application executing on a user device (e.g., a mobile application, a desktop application, a website, etc.) may prompt or guide a user in capturing an image of a receipt (e.g., using a camera of the user device of the user), provide a prompt for sending the image of the receipt to the service provider, and receive a notification from the service provider that the service provider has processed the receipt and identified keywords or catalog items corresponding to the receipt items.

The techniques described herein provide an efficient means for identifying those items that users buy from physical merchants that users might be interested in buying via an online marketplace. The service provider may enable a user to purchase the same or similar items electronically via the service provider, which may allow the user to avoid having to purchase items from a physical store. Traditionally, a service provider could only identify items of interest to a user based on user behavior on an online marketplace associated with the service provider (e.g., items previously purchased by the user via the online marketplace, items added to a cart/list, items searched for by the user, etc.) However, the system described herein uses an automated process to identify the same or similar items a particular user previously purchased from physical stores. In particular, the system described herein may extract text from an image of a receipt from a physical store, use the extracted text as input to a data model to determine keywords for items purchased by the user at the physical store, and generate a list of keywords that represent some or all of the items. The system described herein may use the keywords to identify item identifiers of the same/similar items in a catalog of items maintained by the service provider and present the same or similar items (and/or their respective item identifiers) to the user.

Techniques described herein improve the functioning of the service provider computing device(s) and user device(s). For example, the techniques eliminate the processing load that is required for a user to perform multiple searches and navigate through multiple search results to try to find an item in a crowded online marketplace that is equivalent to an item the user purchased from a physical merchant. Additionally, the techniques described herein allow for mapping multiple items on a receipt via submission of a single image of the receipt. Further, the techniques described herein enable continual improvement of a data model for mapping receipt items to keywords, and keywords to catalog items—the service provider receives input about the accuracy of the matches via a user's purchase or non-purchase of catalog items the service provider recommended. The techniques described herein make the process of mapping more efficient. Fewer communications between a user and the service provider are needed than in a typical user search. Moreover, the techniques described herein allow for fluidity from the physical world to the digital world by converting a hard copy receipt (also referred to herein as a "physical receipt") to a list of keywords that map to online catalog items.

Techniques described herein can be applied to any format of receipt from any merchant. The lack of uniformity in how different merchants describe a same item on their receipts and the fact that product descriptions on a receipt are often abbreviated or coded are challenges that the techniques described herein overcome. Additionally, although receipts are structured data, many different structures can exist for the structured data (e.g., each merchant may have its own receipt format). The methods and systems described herein enable generation of a list of keywords for items a customer purchased at a physical store based on a receipt and a generalized predictive model. Underlying transaction data need not be transmitted to the service provider, which is an improvement over traditional methods of determining purchased items from receipts. The methods and systems described herein extract text to identify the words on a receipt that comprise potential indicators of items purchased (e.g., item description, item identification number, item quantity, item price, item brand, date of receipt, merchant identifier, address of the store, etc.) to build a generalizable data model(s) that can be used to identify a list of likely items purchased in a later transaction, given a receipt for that transaction. The list of keywords may be saved to a user account, revised, or used to query any of a plurality of online catalogs. In some embodiments, an online catalog may contain items offered by a particular merchant.

In some embodiments, keywords for items of the list of items may be mapped to online catalog items by comparing the keywords to descriptions of items offered for sale online by the service provider (e.g., performing a search of the online catalog using the keywords). In other embodiments, the keywords may be mapped to online catalog items by matching keyword(s) to an item identifier(s) without performing a search of a database or catalog. Additionally, techniques described herein can identify multiple possible catalog items corresponding to a single receipt item or keyword. One or more of the catalog items can be presented via a graphical user interface to the user (e.g., in a virtual cart of the user, a virtual shopping list of the user, etc.). In examples, the multiple catalog items include a "best match" catalog item and several alternative or substitute catalog items. A "best match" catalog item for a particular user may be based on the attributes of both the catalog items and of the user. Techniques described herein can also identify, and emphasize to a user, a promoted catalog item that is associated with an item identifier that is mapped to the keyword.

As used herein, an "item identifier" is a combination of letters, numbers, symbols, etc. that correspond to a particular item offered for sale by the service provider electronically (e.g., via a website, mobile application, etc.).

As discussed above, the techniques described herein create training data for identifying a list of keywords for receipt items from a physical receipt. Text data from the text extracted from a physical receipt can be used as training data, with or without human annotation, to build a data model that will produce a list of keywords corresponding to the receipt items based on multiple features of the text data. In an example, the data model can a description of an item extracted from a receipt image with a merchant identifier extracted from the receipt image. In another example, a price associated with a description of an item can indicate that a certain quantity of that item was purchased or confirm what that item is. Training data may also include information provided by a merchant, digital transaction records of a merchant, seasonal changes in price, promotion history, etc. The training data can indicate certain prices and certain item descriptions that a merchant uses; that information can be used by the data model in future applications to increase confidence that a keyword is correct. Greater specificity and quantity of training data through extraction of all text from a plurality of receipts can increase confidence scores of keywords the model outputs.

A data model may be used to identify item identifiers. The data model can be the same or separate from the data model discussed above that generates keywords. That is, a keyword can be associated (by query, mapping, etc.) with one or more catalog items (e.g., one or more item identifiers) via the data model. The service provider may receive direct or indirect feedback from a user about the fit of catalog items that the service provider suggested to purchased items (e.g., via user comments, items ordered by users, etc.). Such feedback may be used as training data in an item identifier data model. For example, that a user purchased a particular catalog item recommended by the service provider based on a keyword may be used as training data for linking the keyword to the item identifier. In such a case, the item identifier data model may be more likely to recommend that particular catalog item over other catalog items when mapping the particular keyword. In other words, the purchase increases confidence that the keyword for the particular receipt item corresponds to the catalog item. As the model is further trained with additional training data, the mapping between keywords and item identifier(s) becomes more accurate.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a schematic diagram of an example process 100 for analyzing text extracted from a physical receipt to generate a list of keywords corresponding to purchased items and using the keywords to identify item identifiers representing catalog items. Each block 102-110 generally corresponds to drawings 112-124 located above the block.

At block 102, a service provider receives an image 112 of a receipt 114 from a user device of a user. In some embodiments, the receipt 114 is a physical receipt provided as a transaction record for a transaction between the user and a merchant at a physical location of the merchant. In some embodiments, the user captures the image 112 using a camera of the user device and transmits the image 112 to the service provider. The receipt 114 may include various information regarding the transaction, such as an identity of the merchant; a physical location of the merchant; contact information of the merchant; a price, a quantity, and/or a description of items purchased from the physical location of the merchant; combined information relating to the transaction, such as a total quantity or price of the purchased items; etc. In some embodiments, the user device sends the image 112 to the service provider via an application executing on the user device or via a website, where the application and the website are associated with the service provider. The service provider may store or otherwise maintain the image 112 in one or more servers or remote devices associated with the service provider.

The receipt 114 may include a plurality of lines of text documenting various aspects of the transaction, as noted above. The text may correspond to one or more of a merchant identifier, a merchant location identifier, a date of the transaction, a time of day of the transaction, an amount of savings applied to the cost of a purchased item or applied in the transaction overall, a name of an employee, a total item count, a total pre-tax transaction amount, a total tax amount, a total transaction amount, loyalty reward points earned for a loyalty program associated with the merchant, loyalty reward points spent, a balance of loyalty rewards points, a loyalty rewards program account number, a URL for a store website, a link to a user feedback website, and/or information (e.g., price, quantity, description, etc.) for each individual item purchased as part of the transaction.

At block 104, the service provider extracts text from the image 112 of the receipt 114. In the illustrated example, the service provider extracts text 116 from the image 112. In some embodiments, the service provider uses an optical character recognition (OCR) algorithm or other text recognition method to determine the words and/or characters included in the image of the receipt. In this example, the text of the image 112 is illustrated as individual words (e.g., "MegaGrocery", "OrgBanana", "$5.01", etc.). As used herein, a "word" can be any segment of text appearing between spaces and can be comprised of a single character (e.g., letters, numbers, symbols, etc.) or multiple characters. As used herein, a "description" (or "item description") can be one or more words included in a receipt that identify an item.

At block 106, the service provider applies a data model to the extracted text 116 to obtain a digital list of keywords 118 and corresponding confidence scores 120. Keywords may be listed in association with confidence scores 120. A confidence score (alternatively referred to herein as a confidence value) represents the service provider's determination of a probability that the keyword(s) is an accurate reflection of a receipt item. In some embodiments, the service provider may compare the confidence score to a threshold confidence score. In such embodiments, the confidence score is less than the threshold confidence score, the keyword(s) may be omitted from further tasks related to the list (e.g., querying with the keyword to identify an item identifier). In some embodiments, the list of keywords may be provided to the user. The user may save, modify, or categorize the list of keywords and/or one or more individual keywords of the list.

The data model generates output (e.g., keywords) at least in part on the extracted text 116 from the image 112. The data model may generate a keyword that is based on all of the extracted text, or based on a particular category of extracted text (also referred to herein as a field or a feature or an attribute), or on a combinations of fields of the extracted data (e.g., item description and merchant identifier), etc. In an example, one type of information (e.g., a price) may refine, or increase the confidence for, a keyword. In some embodiments, the data model may identify one or more fields such as merchant identifier, date, address, etc. which can be used in combination with the description (e.g., OrgBanana) in determining keywords corresponding to that receipt item. In examples, text used as training data may be annotated, tagged, or otherwise indicated as being in a certain category, such as address words, price words, quantity words, etc. Such annotation may be treated by the data model as one of the features of the extracted text. In some embodiments, extracted text from a current receipt may be annotated or categorized before being transmitted to the data model. In some embodiments, the extracted text may be categorized as part of the analysis performed with the data model.

Using the illustrated example, the data model may determine that, if a receipt includes "MegaGrocery" and "WW," "WW" is an abbreviation for "whole wheat" because of training data that indicates that MegaGrocery has used "WW" as a description word for "whole wheat" items. As another example, the word "6" being adjacent to "$6.00" in the extracted text 116 adjacent to "orgbanana" can increase a confidence score that the keywords "organic banana" are correct based on training data indicating that an average price for an organic banana is $1.00, and so $6.00 would be a predicted price for six organic bananas. Moreover, identifying an address in the extracted text in combination with identifying a merchant identifier of "MegaGrocery" can be used to assign a "region" feature on the receipt. In such an example, the data model may increase confidence score for keyword(s) "Brand D Dish soap" because Brand D is the most popular dish soap in the region encompassing the address.

The geospatial placement of extracted text of an image may be used by the training model to determine which text is description, which text is date, which text is price, etc. In an example, "OrgBanana", listed on the fourth line down of the extracted text 116, may be categorized as an item description based on past receipts from "MegaGrocery" indicating that descriptions begin on the fourth line down and are aligned left on the receipt, before quantity and price. The order of the words of the extracted text may indicate which of the plurality of lines of the receipt includes an item description, which includes a merchant identifier, which includes a date, etc. (e.g., the top line includes a merchant identifier, the third line includes the date, and the lines below the date list a description, a quantity, a price, etc. for an individual receipt item). The training model may also incorporate data indicating that if the extracted text includes the word "cereal", the confidence score that a keyword for the receipt is "milk" increases because of an identified complementary relationship between the purchases of cereal and milk.

At block 108, the service provider, using the one or more keywords 118, queries a catalog for an item identifier(s). In some embodiments, the catalog may be one of many catalogs maintained by the service provider and may include items electronically offered for sale online via the service provider. The catalog is accessible to users via a website, mobile application, etc., where the items may be offered directly by the service provider and/or the service provider may offer items for sale on behalf of other merchants or sellers that provide the items. The catalog may correspond to a database, wherein an item is associated with information about the item (e.g., an item identifier, item availability, seller, location, description, purchase history, etc.). In the illustrated example, the query identifies item identifiers 122 (F0012345678, F980733711, F089658721) for keywords (organic banana, dish soap, whole wheat bread) on the list of keywords 118. In other examples, a query may identify no item identifiers or multiple item identifiers for a keyword or set of keywords. In embodiments, the service provider may query any of a number of catalogs. In some embodiments, a catalog may include item identifiers for catalog items offered for sale by a single merchant. In embodiments, the service provider may perform the query in response to the generation of the list of keywords 118 or at any time thereafter.

In some examples, a keyword may be generic ("flour", "refried beans", etc.). In such cases, the service provider may identify a specific item as the correlated catalog item. In some embodiments, the service provider may map the generic keyword to a most popular catalog item matching that description, to a catalog item that a user has previously purchased, etc.

At block 110, the service provider generates a graphical user interface for presenting at least one catalog item corresponding to an item identifier(s) identified in block 108. The graphical user interface may comprise a virtual cart 124 maintained by the service provider in association with a user profile/account of the user. The virtual cart 124 may include information corresponding to an item identifier 122 identified in the query. The virtual cart 124 may contain catalog items unrelated to the receipt 114.

In the illustrated example, the service provider may present information in the virtual cart 124 that is associated with an item identifier 122 ("F0012346789"). In the illustrated example, virtual cart 124 includes a title "My Cart", and the information associated with F0012346789 is "Organic Banana" as the name of the catalog item, "6" as a quantity of the catalog item, "$5.40" as a price of the catalog item(s), and an image of a banana as a graphical representation of the catalog item. Additionally, the virtual cart 124 may include, for one or more of the items, text and/or images indicating shipping information, promotion information, an indication of whether the catalog item is in stock, a seller identifier, etc. (not shown). The information displayed via the virtual cart 124 about a catalog item may be based at least in part on a data record for that catalog item stored in an inventory database of the service provider. The service provider may update a data record upon notification of a change to information associated with an item identifier (e.g., a change in a quantity, price, user-facing description of the item identifier, etc.).

In some embodiments, the virtual cart includes one or more selectable controls corresponding to catalog items. In various embodiments, a selectable control, upon selection, may cause a quantity of a catalog item to be adjusted, may remove the catalog item from the virtual cart 124, or may perform other actions related to the catalog item or virtual cart 124.

The service provider may add a catalog item corresponding to the item identifier to a virtual shopping list (not shown) associated with the user. The virtual shopping list may include similar information as the virtual cart. In some embodiments, the virtual shopping list may include a selectable option corresponding to a catalog item that, upon selection, causes the service provider to transfer the catalog item from the virtual shopping list to the virtual cart (e.g., the service provider may associate an item identifier with a virtual cart and may remove the association between the item identifier and the virtual shopping list). In some embodiments, the virtual shopping list includes a selectable option corresponding to a catalog item presented in the virtual shopping list that, upon selection, causes the service provider to remove the catalog item from the virtual shopping list. In some embodiments, the virtual shopping list and/or virtual cart include a selectable control that, upon selection, designates an item identifier as a "favorite" item of the user (which may cause the item to be associated with a list of "favorites" that is associated with the user account/ profile), designates a catalog item as a catalog item to include in a saved or recurring shopping list (e.g., a base list for weekly grocery shopping, a base list for a recipe, a base list for a holiday meal, etc.), etc.

The service provider may notify the user that the receipt 114 has been analyzed, that a catalog item or keyword that corresponds to a receipt item (e.g., item purchased by the user as part of the transaction associated with the receipt) has been identified, and/or that the same or similar keyword or catalog item is available for the user to view. As used herein, a catalog item "similar" to a receipt item comprises a catalog item that is not identical to the receipt item but that is within the same category of items, is within a same price range as the item, is a variant of the item in an attribute (e.g., a different color, a different size, a different brand, etc.), etc. In various embodiments, the notification may be in the form of a direct message, an e-mail, an alert via a service provider application executing on the user device or another device, an alert via a website associated with the service provider, etc. In some embodiments, the notification may include a selectable control to cause the service provider to display the virtual cart 124 on a display of the user device or another device. In some embodiments, the notification may include information regarding how many of the receipt items the service provider identified (or did not identify) same or similar keywords or catalog items for.

The virtual cart 124 may include a feedback control, which upon selection, allows the user to provide feedback to the service provider regarding the user's opinion of the degree to which a catalog item approximates, matches, is similar to, is equivalent to, is an acceptable or accurate substitute for, etc. a corresponding receipt item listed on the receipt 114. In various embodiments, the feedback control may be associated with one or more of a free-form text field for user comments, a rating scale (e.g., a scale from 1 to 10, with 10 being an exact match between catalog item and receipt item), etc. The service provider may use the feedback from the user to develop or refine rules that correlate keywords for receipt items with item identifiers and/or may incorporate the feedback into the training data. The service provider may annotate inventory data with the feedback, associate the feedback with a user profile/account in a user database, etc.

The techniques described herein may be illustrated via the following example scenario. In the example scenario, a user visits a local grocery store and purchases ingredients to make chocolate chip cookies: butter, white sugar, brown sugar, eggs, vanilla, baking soda, chocolate chips, salt, flour, and walnuts. The user pays for the items at a cash register and receives a receipt, which may be a physical/hard copy paper receipt or an image of the receipt that is sent electronically (e.g., via e-mail, text message, etc.) to a device of the user. Later that night, the user opens the service provider application on her mobile phone. She indicates that she has a receipt to submit to the service provider for purposes of finding similar ingredients in the online marketplace administered by the service provider. The service provider application prompts the user to take a picture of the receipt. The user takes the picture of the receipt with the camera of her user device and uploads the image to the service provider. Provided that the image was electronically provided to, or was otherwise accessible by, the user, the user may upload that image of the receipt to the service provider.

The service provider receives the image of the receipt and extracts the text from the image. The service provider apples a data model to the extracted text of the entire receipt. The data model analyzes the features of the text (e.g., date, merchant, item descriptions, price, etc.) and produces a list of keywords corresponding to the receipt items. In this example scenario, the list of keywords may be butter, white sugar, brown sugar, organic eggs, pure vanilla, generic baking soda, chocolate chips, salt, white flour, and walnuts. The service provider may notify the user and present the list to a user via a user interface. In some embodiments, the list of keywords may be the end product of the analysis of a receipt. The list of keywords may be stored in association with a user account with the service provider, modified by the user, presented to the user, etc., without being used as a basis for query of a catalog. In other embodiments, the list of keywords may be an intermediate product of the analysis and one or more keywords on the list may be used to query one or more online catalogs to identify catalog items that may be the same or similar to a receipt item. In such embodiments, the service provider may notify a user of the same or similar catalog items by placement in a virtual cart or virtual list. In the example above, for most of the ingredients, the service provider may identify catalog items that are likely to be an exact match to the ingredients (e.g., at a confidence score of 95% or greater). The service provider adds these catalog items to a virtual cart associated with the user account. However, the service provider does not identify an acceptable catalog item equivalent for the butter. The butter is a store-brand butter that is not an item in the inventory of catalog items. However, as part of the data model or otherwise, the service provider can obtain the price of the butter (also determined in the text extraction and filtering process) and determine that the butter was sold at a relatively low price. Therefore, the service provider adds a substitute such as an equally inexpensive butter (e.g., a generic brand or an inexpensive name brand) to the virtual cart of the user. The service provider may display an indicator in the virtual cart, adjacent or in proximity to the proposed butter, indicating that the proposed butter is not the exact same item purchased from the grocery store by the user, but that the proposed butter is an item that the service provider estimates is equivalent. As for the walnuts, the service provider does not identify any catalog items that are the same or similar and provides an indication to the user of the failure to find any matching items. However, the service provider also provides an indication to the user of substitute catalog items the user might be interested in (e.g., catalog items that are not the same or similar to the receipt item, but that have been determined to serve a similar purpose, catalog items that other users have purchased when walnuts have previously been unavailable, etc.). A substitute catalog may be a different type of nuts, such as peanuts or macadamia nuts.

The user may order one or more of the catalog items in the virtual cart, indicate that the user is not interested in one or more of the catalog items in the virtual cart, indicate that the user is interested in a catalog item but does not want to order it immediately, etc. These indications can cause the service provider to place an order, remove a catalog item from the cart, or move a catalog item from the virtual cart to a virtual shopping list of items for later consideration, respectively. Additionally, the user may designate all or some of the catalog items to be saved as ingredients for a recipe, so that the user may later access the same set of catalog items to purchase when the user wishes to make that recipe again.

Although the techniques described herein are often described in the context of a grocery store, the techniques described herein are not limited to any particular type of physical store. Moreover, the items purchased by the user at the physical location of a merchant need not be food/drink items and may instead be any type of items.

Figure 2:
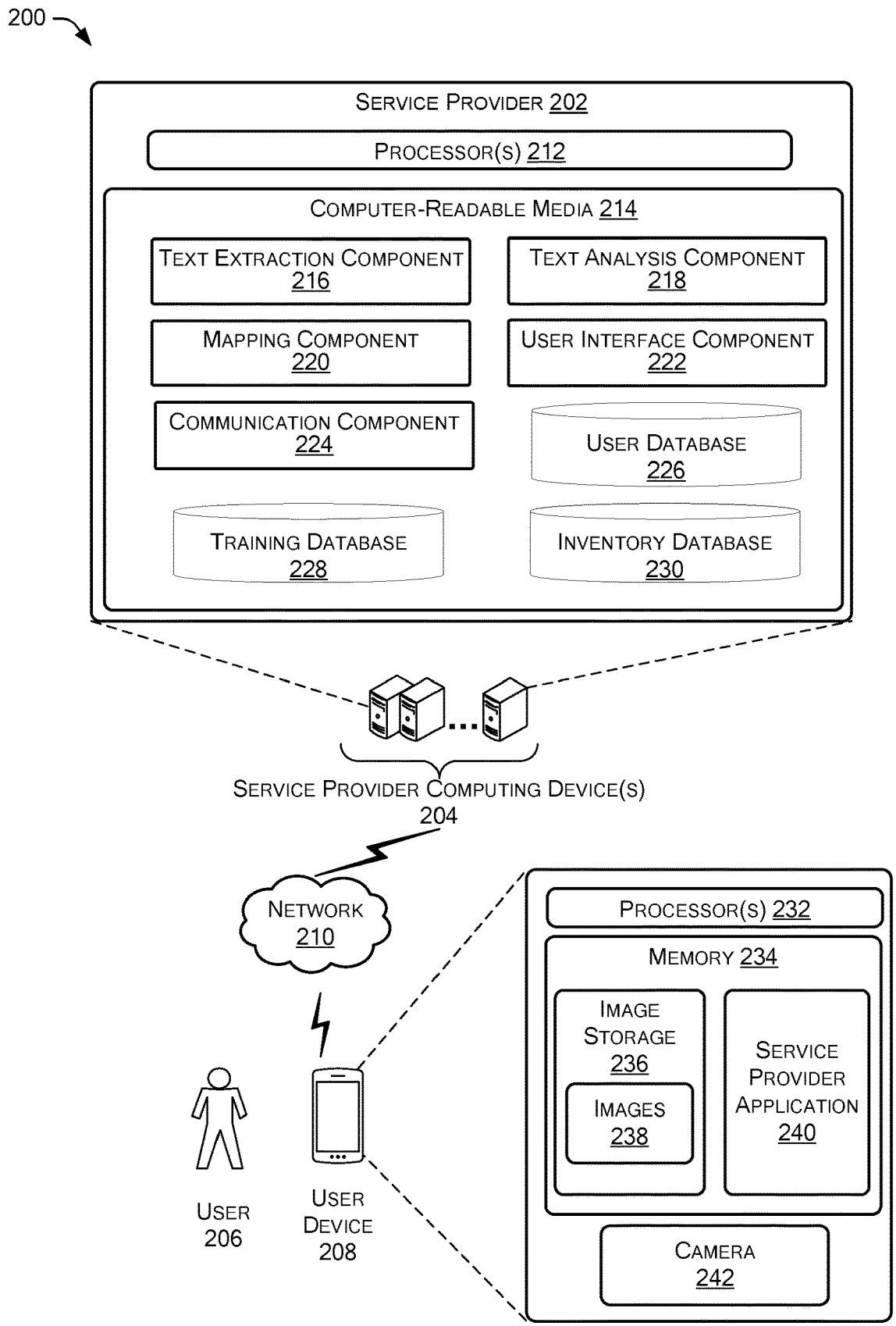
FIG. 2 is an illustrative environment for using an image of a physical receipt to generate a list of keywords corresponding to purchased items and using the keywords to identify item identifiers for catalog items.

FIG. 2 is an illustrative environment 200 for using an image of a physical receipt to generate a list of keywords corresponding to purchased items and using the keywords to identify item identifiers for catalog items. The illustrative environment 200 includes a service provider 202 and one or more service provider computing devices 204 associated with the service provider 202. The service provider 202 and the one or more service provider computing devices 204 are configured, at least in part, to receive images of receipts, generate a list of keywords determined from analysis of extracted text from the images, and identify catalog items that are associated with the keywords. The environment 200 further includes one or more users 206, user devices 208 associated with the users 206, and one or more networks 210, which may facilitate communications, and/or the exchange or transmission of data, between the one or more service provider computing devices 204 and the user devices 208.

For the purpose of this discussion, the service provider 202 and/or the service provider computing device(s) 204 may be any number of servers, an entity, a platform, a service provider, a service provider network, etc., that facilitates identifying items offered for sale online marketplace based on receipt descriptions of items purchased in a physical store. The service provider 202 may maintain a website, platform, database, etc. that is accessible by the users 206 via the user devices 208. In some embodiments, the service provider 202 may offer various network-based (or "cloud-based") services to the users 206 to fulfill computing needs of the users 206. In some embodiments, the service provider 202 may operate service provider networks that include clusters of managed servers (or other hardware-based computing devices) stored in data centers located across different geographic regions.

The service provider computing device(s) 204 may include one or more processors 212 and one or more non-transitory machine-readable computer readable media ("CRM") 214 that stores various modules, applications, programs, and/or other data. The CRM 214 may include instructions that, when executed by the one or more processors 212, cause the processors 212 to perform the operations described herein. That is, the service provider computing device(s) 204 may include one or more processors 212, CRM 214, logic, components, modules, computer-executable instructions, etc. that facilitate operations performed by the service provider 202, as described herein.

The service provider computing device(s) 204 may be implemented as one or more servers and may, in some instances, form a portion of a network-accessible computing system implemented as a computing infrastructure of processors, storage, software, data access, and so forth that is maintained and accessible via a network (e.g., the network(s) 210, etc.), such as the Internet. The service provider computing devices 204 do not require end-user knowledge of the physical location and configuration of the system that delivers the services. Common expressions associated with these one or more servers may include "on-demand computing," "software as a service (SaaS)," "platform computing," "network-accessible platform," "cloud services," "data centers," and so forth. The service provider computing device(s) 204 may maintain an online location, such as a merchant website, an e-commerce site, or other functionality that offers one or more items for purchase.

The processor(s) 212 may include a central processing unit (CPU), a graphics processing unit (GPU), both CPU and GPU, or other processing units or components known in the art. Additionally, each of the processor(s) 212 may possess its own local memory, which also may store program modules, program data, and/or one or more operating systems. Moreover, embodiments may be provided as a computer program product including a CRM 214 having stored thereon instructions (in compressed or uncompressed form) that may be used to program a computer (or other electronic device) to perform processes or methods described herein.

The CRM 214 may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Not all components of the service provider computing device(s) 204 and the user device 208 are shown in FIG. 2. Additional components may include but are not limited to: operating system(s), network interface(s), communication interface(s), input/output device(s), display(s), other modules and data, etc.

The processors 212 and CRM 214 may store or otherwise have access to components including a text extraction component 216, a text analysis component 218, a mapping component 220, a user interface component 222, and a communication component 224. The text extraction component 216 receives an image of a receipt from the user device 208 and processes the image data to produce text data. In some embodiments, text extraction may include steps of text detection and text recognition. In some embodiments, the text extraction component 216 utilizes an object recognition module to detect text as an object. The text extraction component 216 may utilize computer vision techniques, specialized deep learning, standard deep learning, etc., and may include contour detection, image classification, etc. In some embodiments, the text extraction component 216 preserves the line delineation of the receipt in the extracted text, such that there is a delineation between words of one line and words on the next line. In some embodiments, the text extraction component 216 utilizes an optical character recognition (OCR) application (not shown) executing on the service provider computing device(s), which translates the image into letters, numbers, symbols, etc. The text extraction component 216 further groups the letters, numbers, and symbols into separate "words" as defined above. In some embodiments, the text extraction component 216 determines the accuracy of the output of the OCR application. In some embodiments, a confidence score may be generated that represents the OCR application's determination of a probability that the receipt text was recognized accurately. The text extraction component 216 may compare the confidence score to a threshold confidence score. If the confidence score is less than the threshold confidence score, the process may be discontinued and/or the text extraction repeated.

In examples, the text analysis component 218 receives extracted text from the text extraction component 216 and performs operations on the text. In some embodiments, the text analysis component 218 preprocesses the text data. In some embodiments, the text analysis component 218 assigns the words of the extracted text to categories (e.g., a description of a receipt item, a merchant, a date, a time, a total cost, etc.). The text analysis component 218 may base the identification of words of the categories on patterns typically found in text of that category that is unlikely to be found in other words in the text (such as word order, presence of numbers/symbols, adjacent line or words, etc.).

The mapping component 220 receives the extracted text from the text analysis component 218 or text extraction component 216 and generates a list of keywords for the purchased items. The mapping component 220 may also identify item identifiers of catalog items that are the same as, or that are similar to, the receipt item. In at least one example, the mapping component 220 includes a data model(s) and a training component that can train the data model(s). The mapping component 220 can identify keywords of the extracted text using the data model(s), trained with data from a training database 228. In at least one example, the data model(s) can be trained utilizing machine learning mechanisms in which input data (for instance, in the training database 228) includes text extracted from historical receipts. The input data can also include descriptive data indicative of attributes of historical receipts, indications of whether any catalog item has been confirmed as matching that keyword or receipt item (e.g., via user feedback), merchant-provided maps between item descriptions and item identifiers or keywords and idem identifiers, service provider verification of keywords correctly reflecting receipt items, etc. The data model(s) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

For a particular item description on a receipt, a trained data model can output a similarity score indicative of whether the particular description is similar to a historical description from a receipt that is similar to the current receipt. If the similarity score meets or exceeds a threshold similarity, the mapping component 220 may automatically perform the mapping to a keyword(s) without further processing. If the similarity score is below the threshold similarity score, the extracted text may be transmitted to the data model. The extracted text may be used as training data and stored in the training database 228 regardless of whether it is transmitted to the data model. The machine learning mechanism can learn the similarity metric and the threshold similarity score. Automatic mapping of item descriptions to keyword(s) increases the rate at which receipts can be mapped to keywords and ultimately to catalog items.

In some embodiments, the mapping component 220 can provide a confidence score representing how likely it is that a keyword that is identified using the data model is in fact an appropriate match to the item description and/or receipt item. In some embodiments, if the confidence score is less than a threshold confidence score, the mapping component 220 will disqualify the keyword as a match and exclude the keyword from the list of keywords. In examples, the service provider 202 may identify no keywords with a confidence score equal to or greater than a defined threshold confidence score. In such examples, the techniques described herein may provide an indication possible substitutes for the receipt item (e.g., in descending order of confidence score), may omit the keyword from the list, or may provide an indication to a user that the receipt item could not be identified.

The training database 228 may store rules that, when applied to a keyword(s), suggest an item identifier. In some embodiments, the rules can be learned by a machine learning model or mechanism. In some embodiments, the rules can be customized based on merchant, user, etc. A non-limiting example of a rule might require that a keyword derived from a receipt from Grocery Store A be mapped to an item identifier using a sub-database storing historical "matches" between Grocery Store A's keywords and catalog items. In another example, a rule might require that the words of an item description from a receipt from Grocery Store A be mapped directly to catalog items (and/or item identifiers). Refinement of rules can reduce use of mapping resources and can limit false positives or an inundation of results in cases in which the items are matched with some certainty. On a more granular level, a rule can be to return a specific keyword or item identifier(s) under certain circumstances (e.g., an item description of "brandadrkchcal" received from "Down-the-Street Merchant" maps to Brand A Dark Chocolate Almond 8-ounce bar). Alternatively, a rule can be to eliminate a specific item identifier as a possible match for a particular keyword.

The user interface component 222 generates one or more graphical user interfaces to be presented to the user 206. The user interface component 222 may be configured to determine an order for presentation of the set of keywords (e.g., in the order reflected on the receipt, in the order of confidence, etc.). The user interface component 222 may be configured to determine an order for presentation of catalog items (e.g., an order of catalog items in a virtual shopping list, virtual cart, carousel, etc.). In various examples the order may be for a set of catalog items each corresponding to different receipt items or may be for catalog items that are alternative or substitute options for a single receipt item. In some examples, the order may be determined based on user preferences, specific items requested, alphabetic order, price order (e.g., high to low, low to high, etc.), promotions, or the like. In some examples, the order may be the order that the corresponding receipt items were listed on the receipt. In some examples, the order may be based on availability of the catalog items.

The communication component 224 transmits communications between the user 206 and the service provider 202, and between sellers selling on the online marketplace and the service provider. In various examples, the communications include transmitting a message from the service provider to a user that an image of a receipt has been received, transmitting a message to a seller recommending a price for a catalog item based on physical store prices, receiving information from a seller regarding a change in inventory; transmitting a message to a user that the user's virtual cart is ready to view, receiving feedback from a user regarding the acceptability of suggested matching between keywords/catalog items and receipt items, etc. In some embodiments, upon receiving a notification from the mapping component 220 that that a list of keywords has been generated, the communication component 224 may send a message to the user device 208 via the network(s) 210 to indicate that the list is available for viewing, storing, modifying, etc., by the user. The communication component 224 may also send a notification that a set of catalog items in a virtual cart is available for viewing. The message may be provided in a notification, such as a message via the service provider application 240 executing on the user device 208, a website associated with the service provider 202, a text message, an electronic mail message, or any other means by which the communication component 224 may communicate to the user 206. In some embodiments, the user 206 may launch the service provider application 240 on the user device 208. Responsive to launching the service provider application 240, the user device 208 may request access from the communication component 224 to view the list or the set of items. Based on the request to access the list or the set of items, the communication component 224 sends a request to the user interface component 222. The user interface component 222 can generate a graphical user interface for the user 206 that includes the list or the virtual cart displaying the set of items.

The inventory database 230 may store data associated with item(s) offered for sale via the online marketplace. As used herein, "inventory" refers to all items currently in a catalog of items, not merely items currently in stock. In various examples, the inventory database 230 may include items that are authorized for purchase, such as those that are currently available for sale (e.g., in stock, ready for shipment, etc.) for sale and/or items that are currently not available for sale (e.g., out of stock, profitability margin below threshold, etc.), etc. The inventory database 230 may store individual data records for individual products. Data stored in a data record may include an item identifier, location of item, attributes of the item, price, seller, etc.

The user device 208 may include one or more processors 232 and memory 234 that stores various modules, applications, programs, and/or other data. The user device 208 may communicate via the network(s) 210 with other computing systems, such as the service provider computing device(s) 204 associated with the service provider 202, to request a list of keywords or recommendations for catalog items corresponding to receipt items and/or to request access to a preview cart and/or shopping cart associated with the graphical user interface. The user device 208 may capture images 238 of receipts using the camera 242, store the images 238 in image storage 236, and transmit the images 238 to the service provider computing device(s) 204. The image storage 236 and the service provider application 240 may be stored in memory 234 of the user device 208. The service provider 202 may store or otherwise maintain images of receipts in the one or more service provider computing device(s) 204 or one or more remote devices associated with the service provider. Although FIG. 2 illustrates the user device 208 as a particular device (e.g., phone), the user device 208 may include any computing devices, such as personal computing devices (e.g., tablet, eBook reader, etc.), terminal computing devices, laptop computing devices, mobile devices (e.g., mobile phones, media players, handheld gaming devices, etc.).

Figure 3:
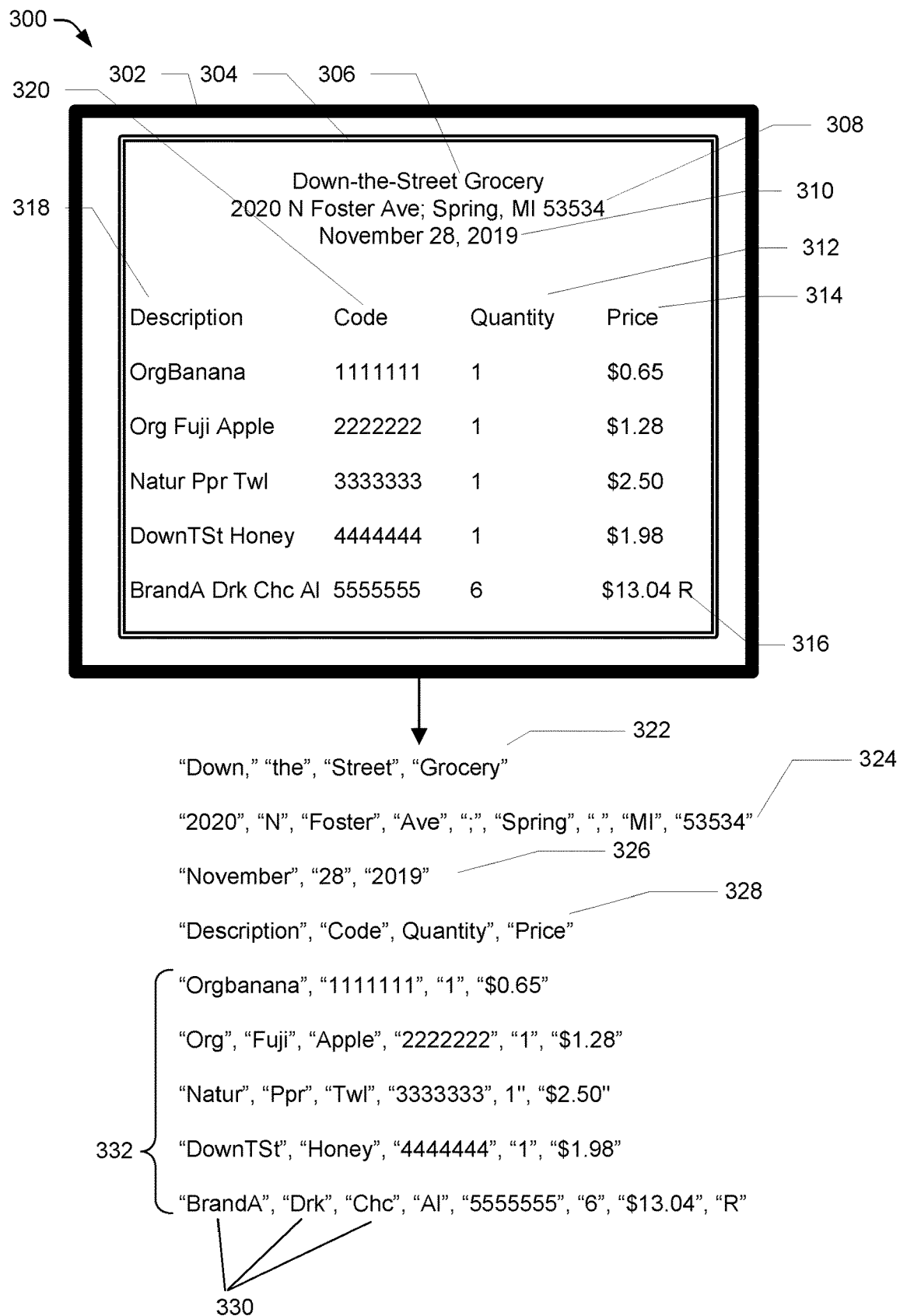
FIG. 3 is an illustration of text extracted from an image of a receipt.

FIG. 3 is an illustration 300 of text extracted from an image of a receipt. Image 302 is an image received from a user device of a user, such as user device 208. The image 302 depicts a receipt 304. The receipt 304 includes information about a purchase transaction between the user and a physical merchant. In examples, the receipt contents can include a merchant identifier 306 of the merchant, an address 308 of the merchant, a date 310 of the transaction, etc. The merchant identifier 306 can include one or more of a merchant name, a merchant number, a store number, etc. In the illustrated example, the receipt 304 includes, for an individual receipt item of a plurality of receipt items listed on the receipt 304, an item description 318, a product code 320 (e.g., a UPC code, an internal store code, etc.), a quantity 312, and a price 314. A price reduction is indicated with a "R" 316 to the right of the price for the "BrandA Drk Chc Al." As discussed below, in some embodiments, a receipt may include other contents. That is, the receipt 304 may include various information about the purchase transaction.

As described above in relation to FIG. 2, the service provider receives the image of the receipt from the user device of the user. In examples, the user may be the customer in the transaction. In other words, a customer in relation to the local merchant may be a user in relation to the service provider. In other examples, the customer may be an agent or employee of the user, or vice versa. Data related to users, user profiles, user accounts, user orders, user contact information, etc. may be stored in user database 226. The text extraction component 216 performs a text detection process and/or text recognition process to determine the text in the image 302 and to arrange the text into discrete words. In some embodiments, an object recognition module may be used to detect text as an object. In some embodiments, a text detection module may be used to detect the presence of text in the image.

In some embodiments, the text analysis component 218 may categorize the words of the extracted text (e.g., words 330) as item description, item, product code, quantity, price, merchant identifier, price, etc. In the illustrated example, words in line of text 322 may be determined to be a merchant identifier, words in line of text 324 may be determined to be an address of the merchant, words in line of text 326 may be determined to be a date of the transaction, words in line of text 328 may be determined to be column headers for the information about the receipt items, and words in lines of text 332 may be determined to correspond to information about the receipt items. In some examples, text corresponding to a particular category can span two or more lines of the receipt (e.g., a lengthy item description). In some embodiments (and as shown in the FIG. 3 example), the text analysis component 218 may determine that lines 332 represent item information, and that in each of lines 332, the words preceding a 7-digit number are item descriptions. In some embodiments, the text analysis component 218 may identify groups of words in the same line as the item description (e.g., lines 332) as product code 320, quantity 312, price 314, price reduction 316, etc.). The text analysis component 218 may generate one or more text strings from one or more of the words in the image. In some embodiments, the extracted text is not categorized before being provided to the predictive data model.

The mapping component 220 determines keywords for receipt items in the extracted text. The mapping component 220 may use the keywords to identify item identifiers in the catalog and may identify catalog items that match or approximate the keywords. As used herein, a "keyword" can include a word that may be used as an index to content of a data record (e.g., a data record for a catalog item). In some instances, a keyword for a catalog item may serve to describe or categorize the catalog item. For instance, for the catalog item "John's Organic Eggs", keywords for this catalog item could include eggs, organic, poultry, locally sourced, etc. In some embodiments, a "keyword" may comprise an object representing a particular product, such as a picture or other metadata indicative of the product, a type of product, a query that can be used to query a catalog for the same or a similar item, or a vector representative of one or more attributes of the receipt items that enables the same or similar items to be located in different catalogs.

In some embodiments, the service provider 202 may use the quantity 312 of an item to place that quantity of items in a user's virtual cart or virtual shopping list. In some embodiments, the service provider 202 may use some or all of the information from the receipt as training data to refine the machine learning model that identifies keywords from receipt images. Thus, identifying the additional information on a receipt makes the mapping process more efficient.

In some embodiments, the image 302 of the receipt 304 may contain still more elements (not shown) (e.g., savings applied to an item, contact information of the merchant, store identifier, name of cashier, total item count, total pre-tax transaction amount, total transaction amount, total tax amount, time of day of transaction, retrieval number, rewards points earned, rewards points spent, rewards points balance, rewards number, a URL for a store website, a link to a user feedback website, etc.). These elements can be used to build the data model and/or be used as input into the data model of a particular receipt. For example, the elements can be used to build intelligence for the service provider about a physical merchant, a user, loyalty rewards programs, etc.

Figure 4:
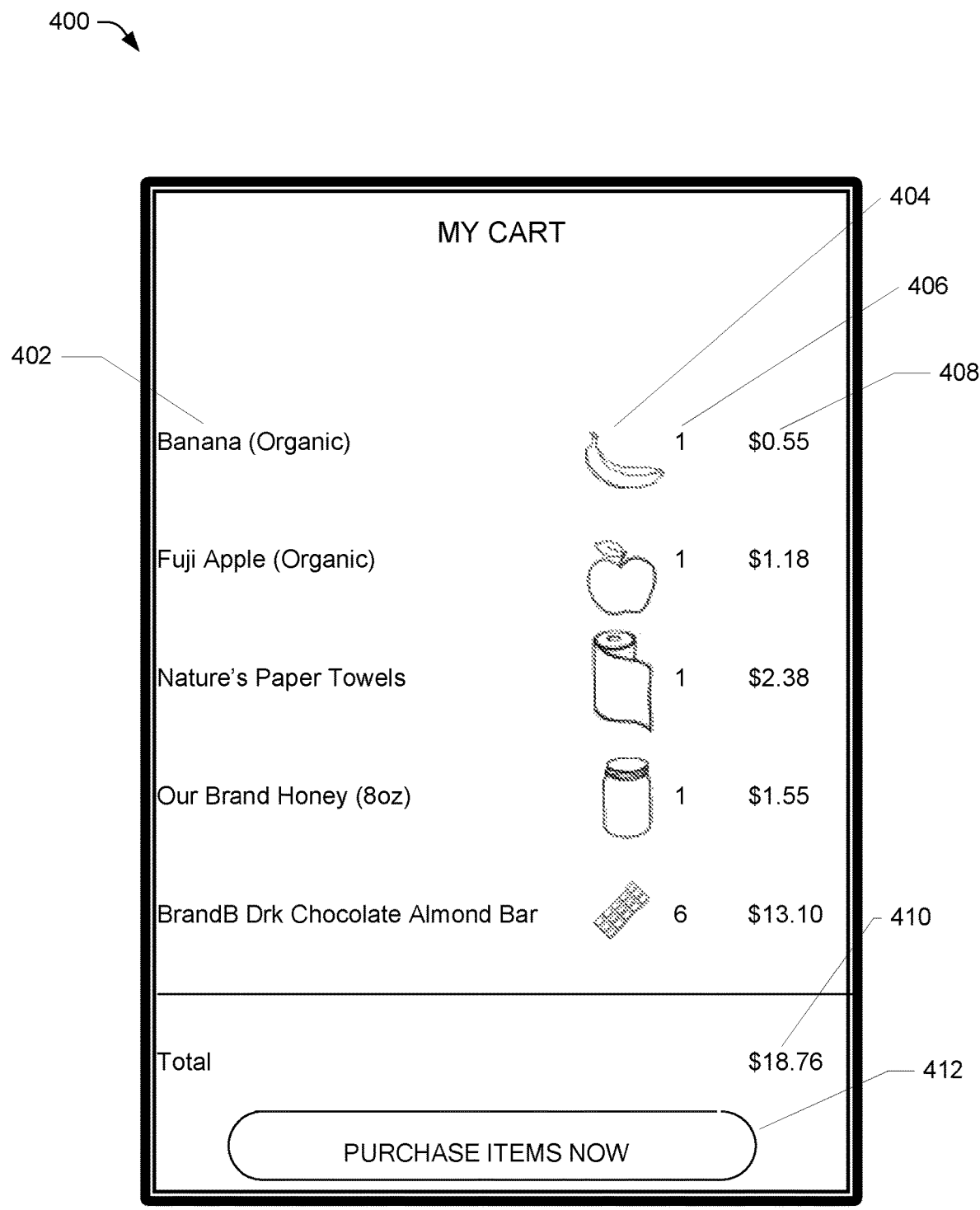
FIG. 4 is an example graphical user interface for displaying information about catalog items suggested for purchase by a service provider responsive to receiving an image of a receipt.

FIG. 4 is an example graphical user interface 400 for displaying information about catalog items suggested for purchase by a service provider responsive to receiving an image of a receipt such as image 302 of receipt 304. FIG. 4 illustrates a virtual cart of a user that includes catalog items that the service provider mapped from keywords derived from extracted text of the receipt shown in FIG. 3. In the illustrated example, the five catalog items included in the graphical user interface 400 are suggested by the service provider based on text extracted from a receipt image received from the user. In other examples, the graphical user interface 400 may include other items, such as items selected by the user. Graphical user interface 400 also displays a total purchase amount 410 for the five catalog items and a "Purchase Items Now" selectable icon 412. The service provider description of a catalog item (e.g., "Banana (Organic)", "Fuji Apple (Organic)", etc.) may be stored in a data record for the item identifier associated with the catalog item. In the illustrated example, information about catalog items in the cart is listed in rows, with each row corresponding to one of the five catalog items. For example, a row corresponding to a banana includes a service provider description 402 of the catalog item ("Banana (Organic)"), a representation 404 of the catalog item, a quantity 406 of the catalog item, and a price 408 for the catalog item. The row may correspond to the row of receipt 304 in FIG. 3 that lists "OrgBanana, 1111111, 1, and $0.55. As discussed relative to FIG. 3, keywords (e.g., organic, banana) may have been identified as a keywords in the predictive data analysis process. The service provider may map at least one of the keywords to an item identifier for the catalog item shown in the first line of the virtual cart in FIG. 4 ("Banana (Organic)").

The user interface component 222 of the service provider computing device(s) 204 may generate the graphical user interface 400. Based at least in part on a notification from the mapping component 220 that the mapping component has identified a list of words or catalog items that match an ingested receipt and/or associated item identifiers of the catalog items with the user account, the user interface component 222 may generate the graphical user interface 400. The user may already have items selected for purchase; these items can be presented via the same graphical user interface 400 or may be presented in a separate graphical user interface. The graphical user interface 400 may display items selected by the service provider based on one or more receipts submitted by the user. In some embodiments, the virtual cart 400 includes an indication (not shown) that one or more of the catalog items were selected by the service provider at least partly in response to a receipt provided by the user. In some embodiments, one or more indicators of the receipt (e.g., receipt image, merchant identifier, date, etc.) may be displayed on the graphical user interface. An indicator may be displayed in association with catalog items that were placed in the cart by the service provider rather than the user in order to notify the user that the catalog items were added without affirmative selection by the user. The catalog items may be listed as "suggested" or "recommended" or the like, and upon acceptance by the user, have the "suggested" or "recommended" indicator removed such that the catalog items may appear in the same format as items selected by the user.

In some embodiments, the service provider 202 may display an indicator on a graphical user interface 400 to indicate that no catalog item was identified as a match for a particular receipt item. In some embodiments, the service provider may display catalog item(s) for the user to consider as possible substitute(s) for the particular receipt item (e.g., catalog items that may be the same as, or similar to, the receipt item). For instance, if the receipt item was organic bananas and the service provider 202 did not have organic bananas available, the service provider 202 may propose non-organic bananas or a different type of fruit. As another example, provided that the receipt item was a can of black beans and the service provider 202 did not have the particular brand of black beans available, the service provider 202 may propose a different brand of black beans.

In some embodiments, the graphical user interface 400 may include several catalog items as matches for a particular receipt item. The graphical user interface 400 may indicate the most highly correlated catalog item (e.g., as determined by a confidence score, number of matching attributes to the receipt item, etc.) and one or more alternative or substitute catalog items. Alternatively, the graphical user interface 400 may indicate all of the alternatives or substitutes without designating one as the "best match" or indicating any particular ranking. In some embodiments, multiple catalog items identified as matches for a single receipt item may be placed in an order. In some examples, the order may be determined based on user preferences, specific items requested, alphabetic order, price order (e.g., high to low, low to high), promotions, availability of the catalog item, etc. Using the example in the preceding paragraph, regardless of whether the brand of black beans was or was not available from the service provider 202 (e.g., was or was not included in the catalog of items maintained by the service provider 202), the service provider 202 could list multiple brands of black beans, canned beans of a different variety (e.g., kidney beans, garbanzo beans, etc.), and so on.

In various examples, the graphical user interface 400 includes an item selection (not shown) configured to provide a means by which the user may select one or more of the catalog items. As illustrated in FIG. 4, the user may select the item selection via an input/output device (e.g., touch enabled display, mouse click, keyboard selection, etc.). In some embodiments, the graphical user interface includes an icon (not shown) configured to provide a means by which the user may select all of the catalog items. Each service provider description 402 and/or representation 404 may be selectable to navigate to a webpage listing additional details about the catalog item (e.g., a specification, additional images, a review, availability data (e.g., estimated date of delivery, shipping information, etc.), etc.), or the like.

FIGS. 5A, 5B, 6A, 6B, and 7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure shall be interpreted accordingly.

Figure 5A:
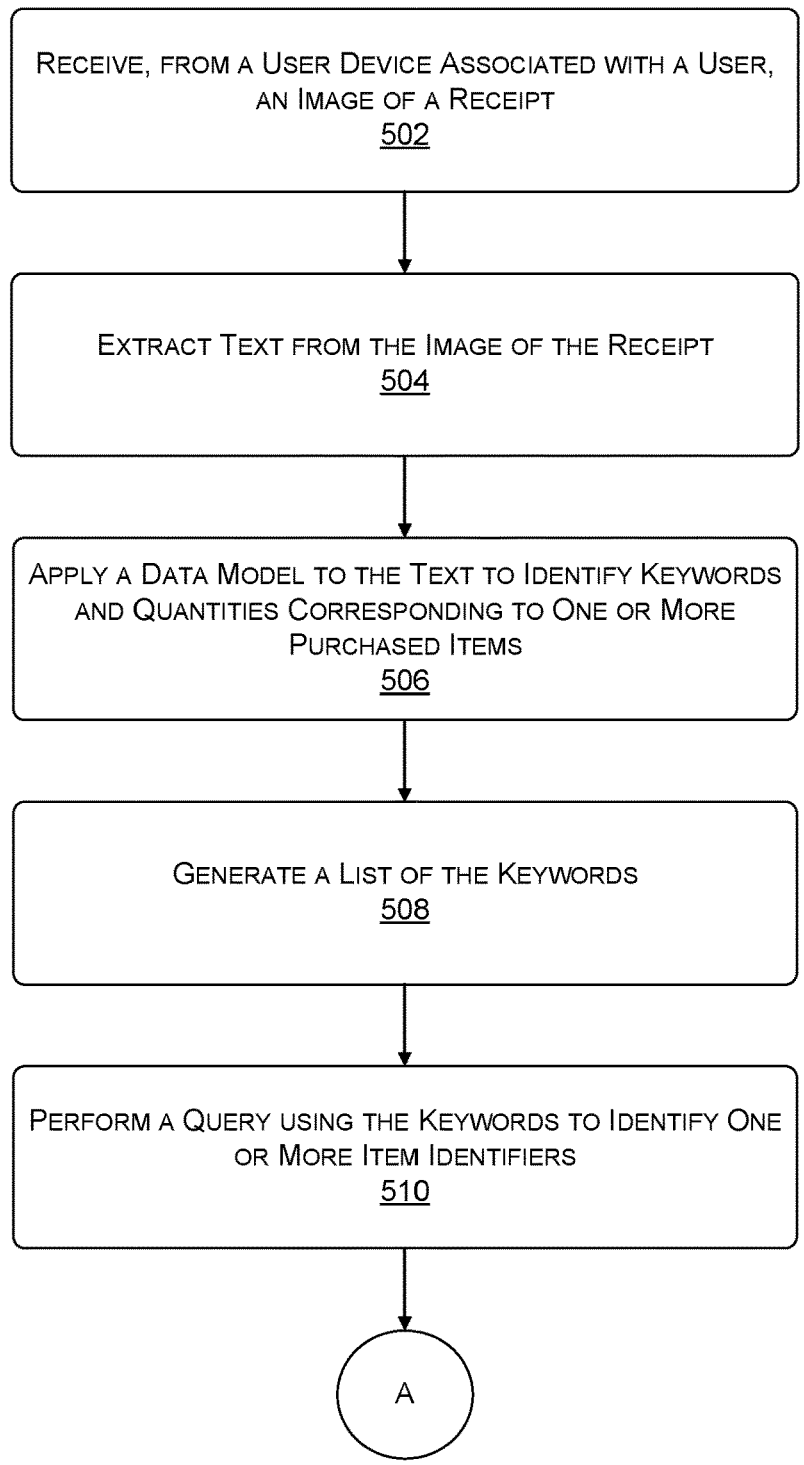
FIGS. 5A and 5B illustrate a flow diagram of an illustrative process of using an image of a receipt to identify and present to a user a catalog item that is the same or similar to an item the user purchased at a physical store.
Figure 5B:
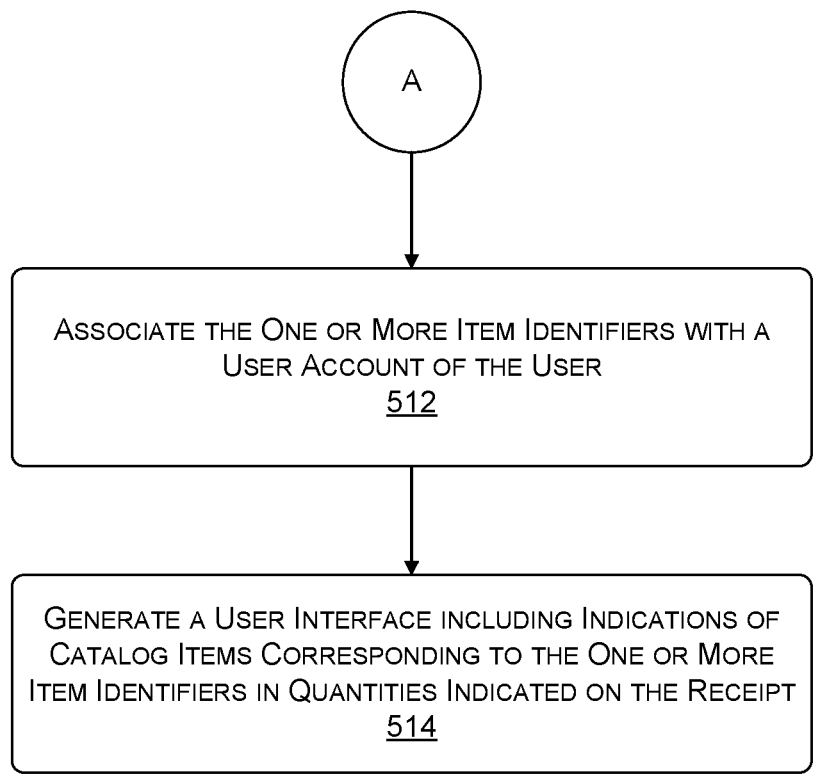

FIGS. 5A and 5B illustrate a flow diagram of an illustrative process 500 of using an image of a receipt to identify and present to a user a catalog item that is the same or similar to an item the user purchased at a physical store. The process 500 is described with reference to the environments and diagrams illustrated in FIGS. 1-4. In various examples, the process 500 may be implemented by a service provider and/or a service provider computing device(s), such as the service provider 202 and service provider computing devices(s) 204, respectively. Of course, the process 500 may be performed in other similar and/or different environments.

At block 502, the service provider computing device(s) receives an image of a receipt from a user device of a user. In various embodiments, the image of the receipt may be an image captured by a camera (such as camera 242) associated with the user device or captured by a separate device and received by the user device. The image of the receipt may be also be sent to the user via a point-of-sale system used to facilitate the transaction associated with the receipt (between the user and a physical store of a merchant). In some examples, the image of the receipt may be received via a service provider application (such as service provider application 240) executing on the user device or a website associated with the service provider 202. The image of the receipt may be accompanied with information provided by the user (e.g., nickname for the particular receipt; information about the transaction (merchant identifier, location of store, date), etc.).

At block 504, the service computing device extracts text from the image of the receipt. Text may include letters, numbers, symbols, etc. Extracting text from an image can convert image data to text data. The service computing device may extract the text using an optical character recognition (OCR) application. In some embodiments, the service computing device may extract the text using an application that performs OCR as well as identification of the contents of fields in forms, tables, etc. via machine-learning models trained on similar forms, tables, etc. Such an application may identify a particular portion of text as describing a receipt item, a price, etc. The output of the extraction comprises one or more words. Identifying an item description or other component from extracted text, when performed, may be performed by comparing the text to a historical receipt similar to the current receipt, by examining the remainder of a line of text after removing numbers, by examining word patterns (e.g., a line that includes the word "BrandA" could be the start of an item description), by comparing the text to previously-identified text strings or word sets from historical receipts, etc.

At block 506, the service computing device applies a data model to the text to identify keywords and quantities corresponding to one or more purchased items. The data model may use historical receipt text data as training data. As discussed earlier, the service computing device may identify one or more of a product code, price, quantity, or indicator of a reduction in price of a receipt item. At block 508, the service computing device generates a list of the keywords identified in step 506. Each purchased item reflected on the receipt may be associated with one keyword or a plurality of keywords. Keywords may include a brand, size, etc., but may also be generic descriptors. In some embodiments (not shown), the processes may end with the generation of list of keywords rather than proceeding to block 510. In such embodiments, the list of keywords may be stored, provided to the user, modified by the user, etc.

Block 510 illustrates performing a query using the keywords to identify one or more item identifiers. As discussed above, an item identifier identifies a catalog item offered for sale via the service provider. In some embodiments, a merchant may provide the service provider 202 with information about the merchant's inventory and corresponding descriptions for products in the inventory (e.g., codes, product identifiers, etc.). In such embodiments, upon receiving an image of a receipt from that merchant, the service provider 202 may map an item description from the receipt to the product name, and the product name could be used to map directly to a catalog item or to be the basis for a more focused search of the catalog, thus providing a more efficient identification of catalog items.

In some embodiments, the mapping component 220 can provide a confidence score representing how likely it is that the item identifier that was identified is in fact an appropriate match to the description, keyword, and/or receipt item. In some embodiments, if the confidence score is less than a threshold confidence score, the mapping component 220 will disqualify the item identifier as a match. In some embodiments, data regarding the price of the receipt item and the catalog item can be compared to check if the mapping is likely correct or incorrect. For example, given a receipt item with a price of $2.50, a mapped catalog item with a price of $50.00 could likely be an incorrect match, but a mapped catalog item with a price of $3.00 could likely be a correct match. In some embodiments, the price of a receipt item can be determined using a similar method as a description from a receipt is determined (e.g., process the image data to obtain text, filter text to obtain word(s) corresponding to price, apply the data model, etc.). In examples, the service provider 202 may identify no catalog items with a confidence score equal to or greater than a defined threshold confidence score. In such examples, the techniques described herein may provide possible substitutes for the receipt item (e.g., in descending order of confidence score). In some examples, a description or keyword may be generic ("flour", "refried beans", etc.). In such cases, the service provider may provide a specific item as the correlated catalog item. In some embodiments, the service provider may map the generic receipt item to a most popular catalog item matching that description/keyword, to a catalog item that a user has previously purchased, etc.

At block 512, the service computing device associates the one or more item identifiers with a user account of the user. In examples, a user account includes identifying information for the user (e.g., name, address, payment instrument identifier, purchase history, etc.) The user account may be associated with at least one of a virtual shopping list or a virtual cart. A virtual shopping list may include a set of item identifiers representing catalog items for the user's consideration. A virtual cart may include a set of item identifiers designated for intended purchase by the user.

At block 514, the service computing device generates a graphical user interface including indications of catalog items corresponding to the one or more item identifiers in quantities extracted from the receipt. The graphical user interface may be similar to the graphical user interface 400.

Figure 6A:
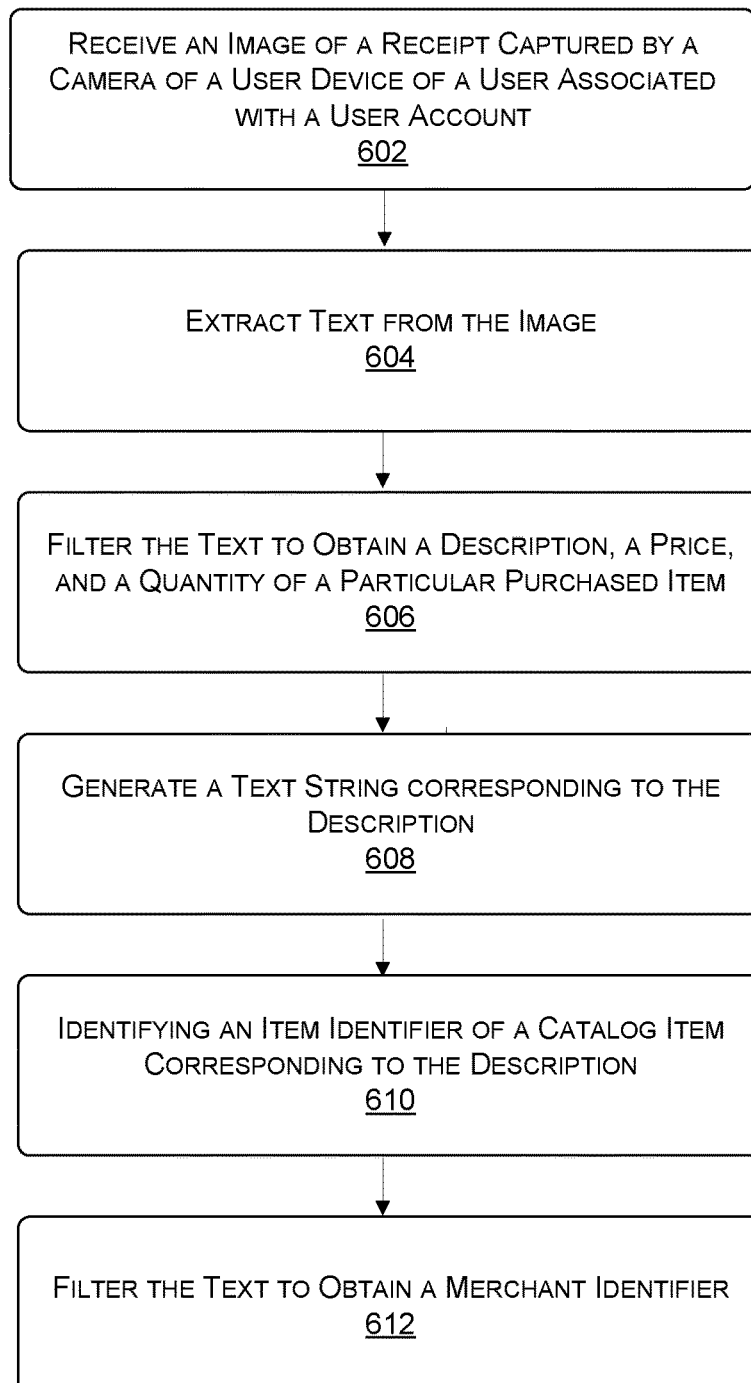
FIGS. 6A and 6B illustrate a flow diagram of an illustrative process for extracting text from an image of a receipt to obtain a plurality of attributes of a transaction between a user and a physical merchant for use as a basis for various actions by an online service provider.
Figure 6B:
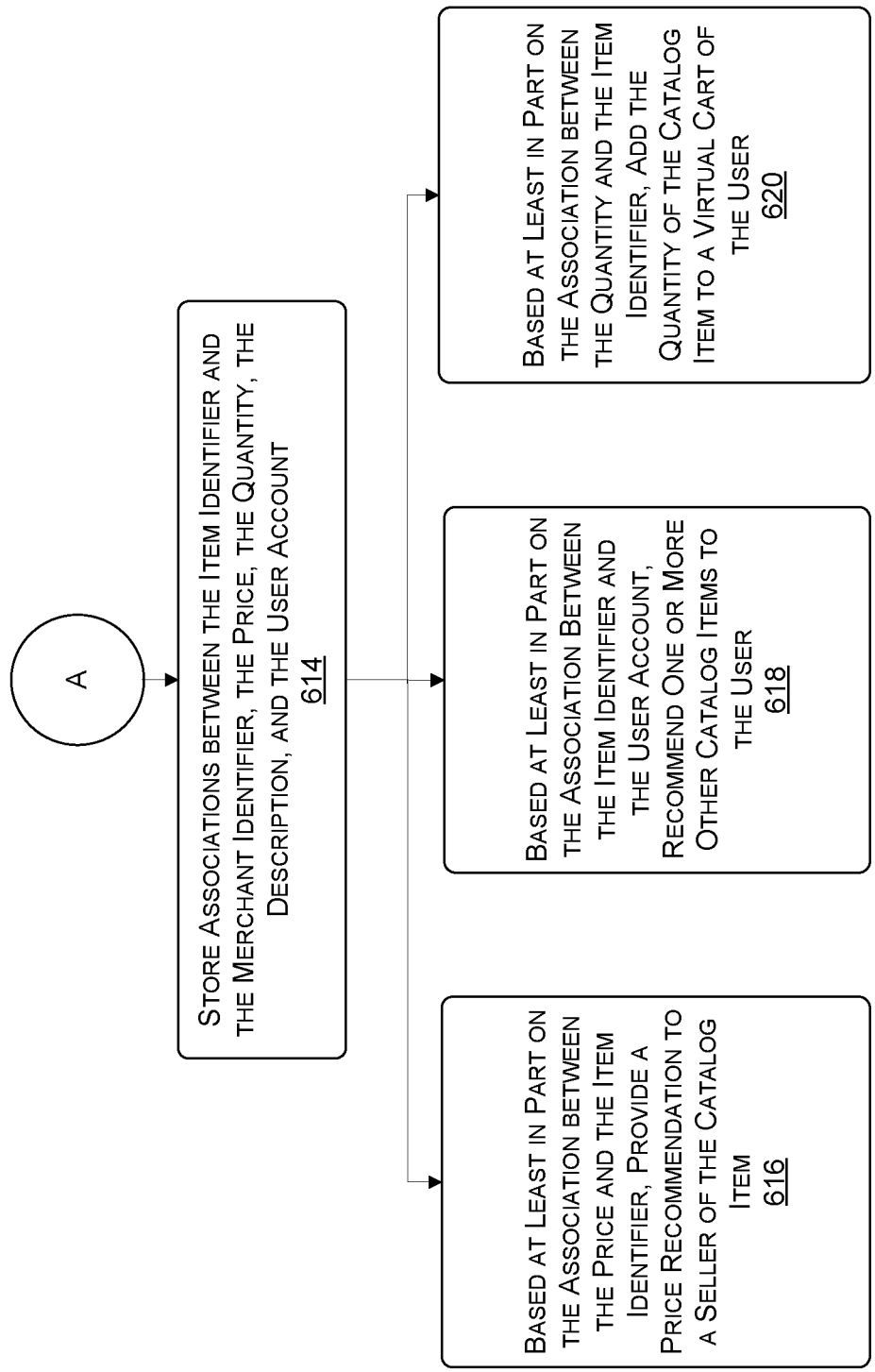

FIGS. 6A and 6B illustrate a flow diagram of an illustrative process 600 for extracting text from an image of a receipt to obtain a plurality of attributes of a transaction between a user and a physical merchant for use as a basis for various actions by an online service provider.

The process 600 is described with reference to the environments and diagrams illustrated in FIGS. 1-5. In various examples, the process 600 may be implemented by a service provider and/or a service computing device, such as the service provider 202 and/or the service provider computing device(s) 204, respectively. Of course, the process 600 may be performed in other similar and/or different environments.

At block 602, the service provider computing device(s) receives an image of a receipt captured by a camera of a user device of a user associated with a user account. The user device may send the image via a service provider application executing on the user device. In examples, multiple pictures may be required to capture the length of an entire receipt. In such examples, multiple images may be sent to the service provider computing device(s), or the service provider application may create a single image from the multiple images before sending to the service provider computing device(s).

At block 604, the service provider computing device(s) extracts text from the image. The service provider computing device(s), based at least in part on receiving the image of the receipt, may perform one or more processing functions on the image in order to determine the text that was printed on the receipt and is included in the image of the receipt. In some embodiments, an optical character recognition (OCR) application converts image data to text data. In some embodiments, the OCR application may divide the text into discrete words, wherein a word may be any segment of text appearing between spaces and may be a single character.

At block 606, the service provider computing device(s) filters the text to obtain at least a description, a price, and a quantity of a receipt item. The filtering process outputs a set of individual words for each of the item description, the quantity, and the price. In some embodiments, additional attributes may be filtered from other areas of the image. In still other embodiments, a single attribute may be filtered.

At block 608, the service provider computing device(s) generates a text string corresponding to the description. In some embodiments, the service provider computing device(s) may generate a plurality of text strings corresponding to an item description. In some embodiments, a text string is a string of lower case letters/numbers/symbols that is created by concatenating one or more words of the item description in one or more orders of the words. In an example, an item description made up of the words "Org", "Fuji", and "Apple" could be used to generate text strings including orgfujiapple, organicfujiapple, and orgapple. The terms "text string" and "search string" are used interchangeably herein. A "text string," as used herein, is a single word, as "word" is defined herein. By combining words to form text strings, mapping to keywords or item identifiers may be made more effective and more consistent. Additionally, by creating various iterations of words of a group of words, the service provider may account for variation in how different physical stores abbreviate descriptions (e.g., "org banana" v. "banana org") for a same or similar item. Further, the text strings also return a broader range of results.

At 610, the service provider computing device(s) identifies an item identifier of a catalog item that is predicted to be the same or similar to the receipt item. In some embodiments, a plurality of item identifiers may be identified for each text string. The item identifier is an identifier created by the service provider to identify a particular catalog item. In some embodiments, a text string may be used as a search string to search an inventory database for item identifiers. In some embodiments, a text string may be mapped directly to an item identifier (e.g., based on a known relationship stored in a set of rules). In some embodiments, the service provider computing device(s) applies a data model to output item identifiers from the extracted text directly.

At 612, the service provider filters the text to obtain a merchant identifier. In some embodiments, an image of a receipt includes a plurality of lines (or other subdivision) of text. Some of the lines may represent details about a purchased item (e.g., description, quantity, etc.). Others of the lines may represent additional information about the transaction (e.g., merchant identifier, merchant contact information, date, loyalty rewards balance, etc.). In some embodiments, the service provider may identify a line of text as a line that lists the merchant identifier (e.g., the merchant's name) based on the geospatial location of the line relative to other lines of text in the image of the receipt. In some embodiments, the top-most line of a receipt includes a merchant identifier (e.g., a name of a merchant, a store number, etc.).

At 614, the service provider computing device(s) stores associations between the item identifier and the merchant identifier, the price, the quantity, the description, and the user account. In some embodiments, this data may be stored in a data record corresponding to a receipt identifier in a receipt database or stored in a data record corresponding to the item identifier in the inventory database.

At 616, the service provider computing device(s), based at least in part on the association between the price and the item identifier, provides a price recommendation to a seller of the catalog item. In some embodiments, the seller sells catalog items via the online marketplace. In some embodiments, the service provider may use information from the image of the receipt to generate a recommendation to a seller of the catalog item corresponding to the item identifier regarding the price the seller charges for the catalog item. For example, if the receipt indicates that the user purchased a 16-ounce jar of Brand X pepperoncini at a physical store for $1.50 but the seller lists the same product for $2.50, the service provider may send the seller a recommendation suggesting the seller charge a lower price.

At 618, the service provider computing device(s), based at least in part on the association between the item identifier and the user account, recommends one or more other catalog items to the user. In some embodiments, the service provider may analyze a user's purchases from the online catalog for the purpose of recommending other catalog items to the user. In process 600, the service provider may additionally base recommendations to the user on item identifiers of receipt items the user purchased in a physical store (regardless of whether the user actually purchased an equivalent catalog item).

At 620, the service provider computing device(s), based at least in part on the association between the quantity and the item identifier, adds that quantity of the catalog item to a virtual cart of the user. For example, the service provider may filter or apply a data model to the extracted text of an image of a receipt to determine that a user purchased bananas at a physical store, and to determine that the user purchased six bananas. When adding a banana to the user's virtual cart as a possibly equivalent catalog item, the service provider may use the quantity information derived from the receipt and include six bananas in the virtual cart rather than one.

Figure 7:
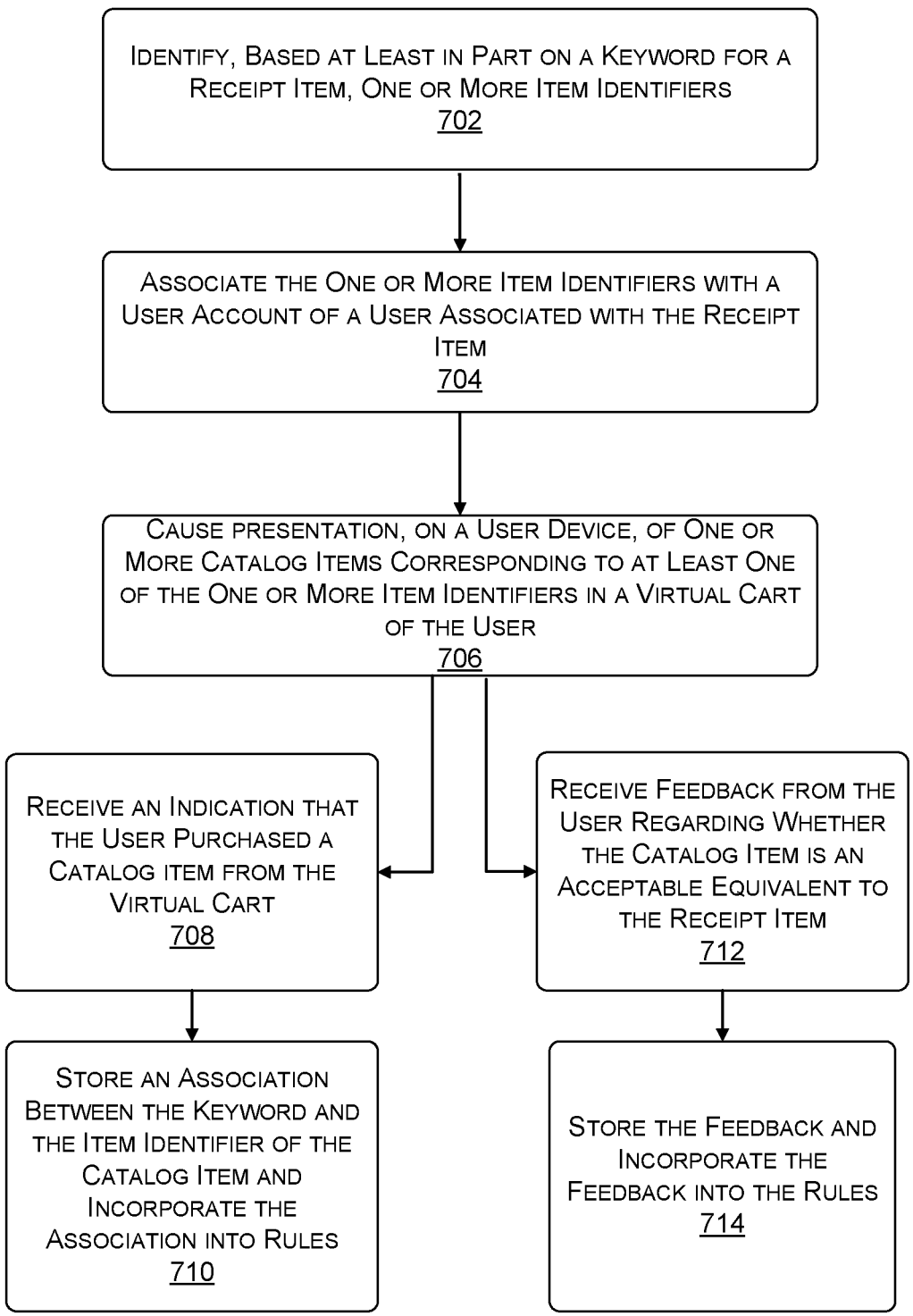
FIG. 7 illustrates a flow diagram of an illustrative process for incorporating user input into a set of rules for identifying catalog items.

FIG. 7 illustrates a flow diagram of an illustrative process 700 for incorporating user input into a set of rules for identifying catalog items. The process 700 is described with reference to the environments and diagrams illustrated in FIGS. 1-6. In various examples, the process 700 may be implemented by a service provider and/or a service computing device, such as the service provider 202 and/or the service provider computing device(s) 204, respectively. Of course, the process 700 may be performed in other similar and/or different environments.

In block 702, the service provider identifies, based at least in part on a keyword for a receipt item, one or more item identifiers. The service provider can obtain, from applying a data model to an image of a receipt, keywords for a purchased item. The service provider may apply a set of rules from a data model to the keyword or query a database using the keyword to determine one or more item identifiers for catalog items that are the same or similar to the purchased item.

In block 704, the service provider associates the one or more item identifiers with a user account of a user associated with the receipt item. A user who sent the service provider the image of the receipt may have a user account or user profile maintained by the service provider. A user account/profile may include identifying information for the user (e.g., name, address, payment instrument identifier, purchase history, etc.). Based on user information associated with the image of the receipt when received by the service provider, the service provider may associate the one or more item identifiers for a receipt item with the user account/profile. Associating the user account/profile with the item identifier(s) allows the user's purchase behavior to be stored and enables population of the user's virtual cart with the catalog item(s) associated with the item identifier(s).

In block 706, the service provider causes presentation on a user device of one or more catalog items corresponding to the at least one of the one or more item identifiers. In some embodiments, the service provider generates a user interface that includes a virtual cart that includes the identified catalog item(s). The user may review the catalog items to determine their similarity to the receipt item and/or to purchase the catalog items.

In block 708, the service provider receives an indication that the user purchased a catalog item from the virtual cart. In some embodiments, the service provider may receive a notification, via a communication component of the service provider, of one or more catalog items the user purchased.

In block 710, the service provider stores an association between the keyword and the item identifier of the catalog item and incorporates the association into rules and training data for future correlations between keywords and catalog items. For example, if three catalog items were presented in the user's virtual cart as possible matches to a receipt item, and the user purchased a first item of the three items, the service provider may store an association between the keyword and the item identifier for the first item. The service provider may also store an indication that the second and third catalog items were presented to the user but not purchased as an indication that those two items may not be the same or similar as the receipt item.

In block 712, the service provider receives feedback from the user regarding whether the catalog item(s) is an acceptable equivalent to the receipt item. In some embodiments, a feedback option may be presented to the user in the virtual cart, in a receipt, etc. The feedback option may prompt the user to provide an opinion about the equivalence of the catalog item(s) and the receipt item(s).

In block 714, the service provider stores the feedback and incorporates the feedback into rules. The service provider may incorporate the user's feedback into rules or training data to strengthen or weaken the correlation that led to the selection of the catalog item(s) in relation to the receipt item.

Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A method comprising:
   receiving, by one or more servers of a service provider and from a user device of a user, an image of a receipt, wherein the receipt is associated with a transaction for one or more items purchased by the user from a merchant at a physical location of the merchant, and wherein the user device captured the image;
   detecting, by the one or more servers using an automated text detection process on the image, text included in the receipt;
   processing, by the one or more servers and based on a text recognition algorithm, data associated with the text;
   training a predictive model using text data associated with historical receipts representing transactions conducted at physical locations of a plurality of merchants;
   based on the data associated with the text and using the predictive model, outputting, by the one or more servers, a list of keywords, wherein individual keywords in the list correspond to purchased items of the one or more items purchased;
   assigning, by the one or more servers, a confidence score to an individual keyword of the list of keywords, the confidence score reflecting the confidence of the predictive model that the individual keyword is associated with the corresponding purchased item;
   determining, by the one or more servers, that the confidence score is equal to or greater than a threshold confidence score;
   based at least in part on the confidence score of the individual keyword being equal to or greater than the threshold confidence score, identifying, by the one or more servers, a catalog item within a catalog of items maintained by the service provider, wherein identifying the catalog item comprises at least one of:
     comparing the individual keyword to catalog descriptions associated with catalog items included within the catalog; or
     identifying an association between the individual keyword and a catalog item;
   associating, by the one or more servers, the catalog item with a user account of the user maintained by the service provider;
   generating, by the one or more servers and for presentation via the user device, a graphical user interface of a virtual cart of the user, the virtual cart including the catalog item; and
   sending, by the one or more servers and to the user device, an instruction to present the graphical user interface.

2. The method of claim 1, further comprising:
   determining, by the one or more servers and based on the data associated with the text, a merchant identifier of the merchant,
   wherein the association between the individual keyword and the catalog item is based at least in part on the merchant identifier.

3. The method of claim 1, further comprising:
identifying an additional catalog item of the plurality of catalog items that corresponds to the individual keyword; and
associating the additional catalog item with the user account,
wherein the virtual cart of the user includes the catalog item, the additional catalog item, and a prompt for the user to indicate an opinion of whether the catalog item or the additional catalog item matches the purchased item.

4. The method of claim 1, wherein the virtual cart includes an indication of a purchased item with which the catalog item corresponds.

5. A system comprising:
a database storing information associated with a plurality of catalog items offered for sale via a service provider, wherein the information includes item identifiers for the plurality of catalog items;
one or more processors; and
computer-readable media storing computer-executable instructions that, when executed by the one or more processors, cause the one or more processors to perform acts comprising:
receiving, from a user device of a user, an image of a document, wherein the document is associated with a transaction for one or more items purchased by the user from a merchant at a physical location of the merchant;
extracting text from the image;
based at least in part on the text and application of a predictive model trained using text of documents associated with a plurality of historical transactions, identifying a first keyword corresponding to a first purchased item of the one or more items purchased and a second keyword corresponding to a second purchased item of the one or more items purchased;
determining a first confidence score reflecting a first confidence of the predictive model that the first keyword is associated with the first purchased item and a second confidence score reflecting a second confidence of the predictive model that the second keyword is associated with the second purchased item; and
based at least in part on the first confidence score and the second confidence score being equal to or greater than a threshold confidence score, presenting, via the user device, a shopping list including at least the first keyword and the second keyword.

6. The system of claim 5, wherein the first keyword comprises a first item identifier of a first catalog item associated with a catalog of catalog items.

7. The system of claim 5, the acts further comprising:
based at least in part on the first keyword, querying a catalog of items maintained by the service provider to identify an item identifier of a catalog item that corresponds to the first purchased item, wherein identifying the item identifier comprises comparing the first keyword to catalog descriptions associated with catalog items included within the catalog of items;
associating the item identifier with a user account of the user maintained by the service provider; and
adding the catalog item to a virtual cart of the user maintained by the service provider.

8. The system of claim 7, wherein the virtual cart includes, in association with the catalog item, an indication of a name, a quantity, a price, and a selectable feedback option that, when selected by the user via the user device, allows the user to provide feedback regarding a similarity between the catalog item and the first purchased item.

9. The system of claim 7, wherein the threshold confidence score comprises a first threshold confidence score, and wherein identifying the item identifier further comprises determining that a third confidence score representing a correlation between the first keyword and the item identifier is equal to or greater than a second threshold confidence score.

10. The system of claim 7, the acts further comprising:
based at least on the text, identifying a third keyword corresponding to the first purchased item; and
generating, by the one or more servers, a text string based at least in part on the first keyword and the third keyword, wherein the text string comprises a single word,
wherein identifying the item identifier comprises comparing the text string to the catalog descriptions.

11. The system of claim 9, the acts further comprising:
receiving input that a user has purchased, via the service provider, the catalog item; and
increasing the third confidence score representing the correlation between the first keyword and the item identifier.

12. The system of claim 5, the acts further comprising:
based at least in part on the text, identifying a third keyword corresponding to the first purchased item;
determining a third confidence score associated with the third keyword; and
based at least in part on the third confidence score being equal to or greater than the threshold confidence score and the first confidence score, presenting, via the user device, the third keyword before the first keyword.

13. The system of claim 5, wherein the threshold confidence score comprises a first threshold confidence score, and the acts further comprising:
determining that a third confidence score representing a probability that the text was extracted accurately is equal to or greater than a second threshold confidence score,
wherein extracting the text from the image includes determining that the third confidence score is equal to or greater than the first threshold confidence score.

14. The system of claim 5, wherein receiving the image from the user device comprises receiving the image via a mobile application executing on the user device, wherein the mobile application is associated with the service provider, and wherein the image is captured via a camera of the user device based at least in part on a prompt on a display of the user device from the mobile application.

15. A method comprising:
receiving, by one or more servers of a service provider and from a user device of a user, an image of a document, wherein the document is associated with a transaction for one or more items purchased by the user;
extracting, by the one or more servers of the service provider, text from the image;
based at least in part on the text and on a predictive model, identifying, by the one or more servers of the service provider, a keyword to describe a purchased item of the one or more items;
identifying, by the one or more servers of the service provider, a catalog item, of a plurality of catalog items maintained by the service provider, corresponding to the keyword, wherein identifying the catalog item comprises at least one of:

comparing the keyword to catalog descriptions associated with the plurality of catalog items; or identifying an association between the keyword and the catalog item of the plurality of catalog items; and storing, by the one or more servers of the service provider, an association between (i) a user account associated with the user and maintained by the service provider and (ii) the catalog item.

16. The method of claim 15, wherein storing the association between the user account and the catalog item comprises associating the user account with an item identifier corresponding to the catalog item.

17. The method of claim 15, further comprising:

based at least in part on the text, identifying, by the one or more servers of the service provider, a price associated with the purchased item; and based at least in part on the price, provide, by the one or more servers of the service provider, a recommendation, to a merchant offering the catalog item for sale via the service provider, for an amount to charge for the catalog item.

18. The method of claim 15, further comprising:

determining, by the one or more servers of the service provider, that the catalog item is not currently available;

based at least in part on the keyword and the catalog descriptions associated with the plurality of catalog items, identifying, by the one or more servers of the service provider, an additional catalog item of the plurality of catalog items;

associating, by the one or more servers of the service provider, the user account with the additional catalog item;

generating, by the one or more servers of the service provider and for presentation via a user device, a graphical user interface of a virtual shopping list of the user, the virtual shopping list including the catalog item and the additional catalog item; and sending, by the one or more servers of the service provider and to the user device, an instruction to present the graphical user interface.

19. The method of claim 15, wherein the keyword comprises an item identifier.

20. The method of claim 15, further comprising training, by the one or more servers of the service provider, the predictive model using text associated with documents associated with a plurality of historical transactions conducted with a plurality of merchants.

* * * * *